INTERLOCKING OF SELECTED UNITS OF A STORAGE SYSTEM

Filed Feb. 20, 1967 3 Sheets-Sheet 1

INVENTORS
CARL J. DEAN
DAVID M. WRIGHT
BY
Dike, Thompson & Bronstein
ATTORNEYS

INTERLOCKING OF SELECTED UNITS OF A STORAGE SYSTEM

Filed Feb. 20, 1967

INVENTORS
CARL J. DEAN
DAVID M. WRIGHT
BY
Dike, Thompson & Bronstein
ATTORNEYS

INTERLOCKING OF SELECTED UNITS OF A STORAGE SYSTEM

Filed Feb. 20, 1967

3 Sheets-Sheet 3

INVENTORS
CARL J. DEAN
DAVID M. WRIGHT
BY
Dike, Thompson & Bronstein
ATTORNEYS 3,404,929

INTERLOCKING OF SELECTED UNITS OF A STORAGE SYSTEM

David M. Wright, Shrewsbury, and Carl J. Dean, Southbridge, Mass., assignors to Barry Wright Corporation, Watertown, Mass., a corporation of Massachusetts Filed Feb. 20, 1967, Ser. No. 617,140
10 Claims. (Cl. 312—216)

ABSTRACT OF THE DISCLOSURE

A system of independent units, such as a storage cabinet with a plurality of drawers, in which selected units, i.e. drawers, of the system are interlocked and prevented from moving in response to the movement of a particular unit, i.e. drawer, of the system.

Illustratively, a movable locking bar within the cabinet, and spanning the drawers, includes a separate pin projection for each of selected drawers. Upon each such drawer is mounted a two-part cam assembly for engaging the corresponding pin. During the withdrawal of a particular drawer, its cam assembly acts upon the associated pin projection to move the bar to a position where the cam assemblies of the other drawers are blocked by the other pin projection, thus locking the other drawers in place. Upon closure of the withdrawn drawer, the bar is returned to its original position.

The cam assembly operates upon its associated pin projection by ramp surfaces which move the bar in successive and opposite directions. A further ramp surface operates to reposition the bar should it move inadvertently with a drawer open.

Also disclosed is a single key lock unit by which all of the drawers can be secured in a closed position. The lock unit includes a crank which turns, upon being actuated by a key, and contacts brackets on the locking bar, moving it to a position where the cam assemblies of all drawers are blocked.

*Background of the invention*

This invention relates to the interlocking of selected units of a system and, more particularly, to the interlocking of selected drawers of a storage cabinet.

It is often desirable to prevent selected units of a system from moving independently of each other. Such is the case where a specified drawer of a filing cabinet has been opened. The remaining drawers of the cabinet are desirably interlocked in a closed position in order to prevent the accidental opening of other drawers, which could lead to confusion or tipping of the cabinet.

The problem of accidental tipping is particularly acute with cabinets having extensive vertical tiers of drawers, as is common practice with modern storage units designed to accommodate records and data in an age of automation.

Because of the extent of data and information being generated, it is necessary to have efficient and readily accessible storage. For ease of handling, the drawers are desirably of limited width. However, to conserve space, the drawers are stacked upon each other vertically. It is apparent that an accidental opening of a nonselected drawer, particularly in the upper tier of a cabinet, could cause tipping. Not only does such an occurrence pose a possible physical hazard but it also plays havoc with the records that are spilled.

Another consideration in modern record keeping is that the contents of the drawers should be readily accessible. This means that the drawers should be capable of being opened with a minimum of difficulty. To the extent that a drawer is easy to open, there is an increased possibility of accidental opening and danger of tipping.

One technique for preventing drawers from opening accidentally is to secure each drawer with a separate latch. This technique not only adds complexity and expense, because of the latch, but it can also detract from the ease of use and speed of operation.

Another technique is to use a locking bar by which the withdrawal of one drawer will cause the other drawers to be latched in a closed position. In many cases the mechanical complexity of such an arrangement is on the order encountered in using individual latches. Moreover, unless precautions are taken, there is the possibility of accidental movement of the locking bar by which the drawers are uncontrollably locked in position where none of them can be withdrawn.

Accordingly, it is an object of the invention to facilitate the selective locking of individual units of a system. A related objects is to achieve the selective interlocking of drawers of a tiered filing cabinet. Another related object is to control the degree to which tipping can take place accidentally in a filing system.

A further object of the invention is to achieve the selective interlocking of filing cabinet drawers by an arrangement of simple design. A related object is to achieve the desired interlocking action by a mechanism which is facile of manufacture.

A still further object of the invention is to provide for the interlocking of filing cabinet drawers by a mechanism which protects against accidental release of the interlock mechanism. Still another object of the invention is to provide for the controlled locking of selected drawers of a filing system from a single access point.

*Summary of the invention*

In accomplishing the foregoing and related objects, the invention provides a slidable member disposed within a frame and spanning a plurality of units. Each of selected units is proportioned to cooperate with the slidable member so that when a particular unit is moved, the remaining units are locked in position.

In the case of a filing cabinet system, the slidable member is in the form of a locking bar with a plurality of projections, one for each drawer. In addition, each drawer includes a cam assembly which is proportioned to engage its associated projection on the locking bar. When a specified drawer is withdrawn, its cam assembly engages a pin projection and moves the locking bar so that the cam assemblies of the other drawers are blocked by their pin projections. Consequently, the other drawers cannot be withdrawn until the opened drawer is closed.

For a particular embodiment of the invention, the cam assembly includes two members with facing cam surfaces. One of the surfaces engages the associated pin projection to move the bar in one direction as a selected drawer is being withdrawn; while a cam surface of the other member engages the pin projection to move the bar in the opposite direction as the drawer is closed. With a vertical tier of drawers, the locking bar is positioned to move vertically upward and downward, and each cam assembly has upper and lower members with respective and oppositely facing upper and lower ramp surfaces. The lower ramp surface, of the lower member, engages the pin projection to move the bar upward as the selected drawer is withdrawn. This moves the pins associated with other drawers to the front of the upper members of their cam assemblies, causing them to be blocked. The upper ramp surface, of the upper member, engages the elevated pin projection as the selected drawer is closed, moving the locking bar downward and unblocking the other drawers.

In accordance with one aspect of the invention, the cam assembly is proportioned so that upon inadvertent movement of the locking bar, from the position where it has been set, an opened drawer may nevertheless be returned to a closed position. This is accomplished for one embodiment of the invention by an auxiliary cam surface on one member of the cam assembly. With a vertical tier of drawers, the auxiliary cam surface is desirably on the lower member in the form of a ramp surface which slopes away from the surface by which the locking bar is elevated upon withdrawal of a selected drawer, so that the bar can also be elevated if it inadvertently falls while the drawer is in an open position.

In accordance with another aspect of the invention, the locking bar is adapted to be turned by a crank mechanism so that all of the units may be secured in a prescribed condition in a single operation. With a filing cabinet, the crank mechanism extends to a keyed lock and is mounted in the vicinity of the locking bar, which has brackets that are acted upon by the crank as the key is turned. When all of the drawers are closed, rotation of the crank elevates the bar to a position where all of the cam assemblies, and hence all of the drawers, are blocked by pin projections.

*Brief description of the drawings*

Other aspects of the invention will become apparent after considering illustrative embodiments thereof, taken in conjunction with the drawings, in which.

*Description of the preferred embodiments*

Figures 1, 1A:
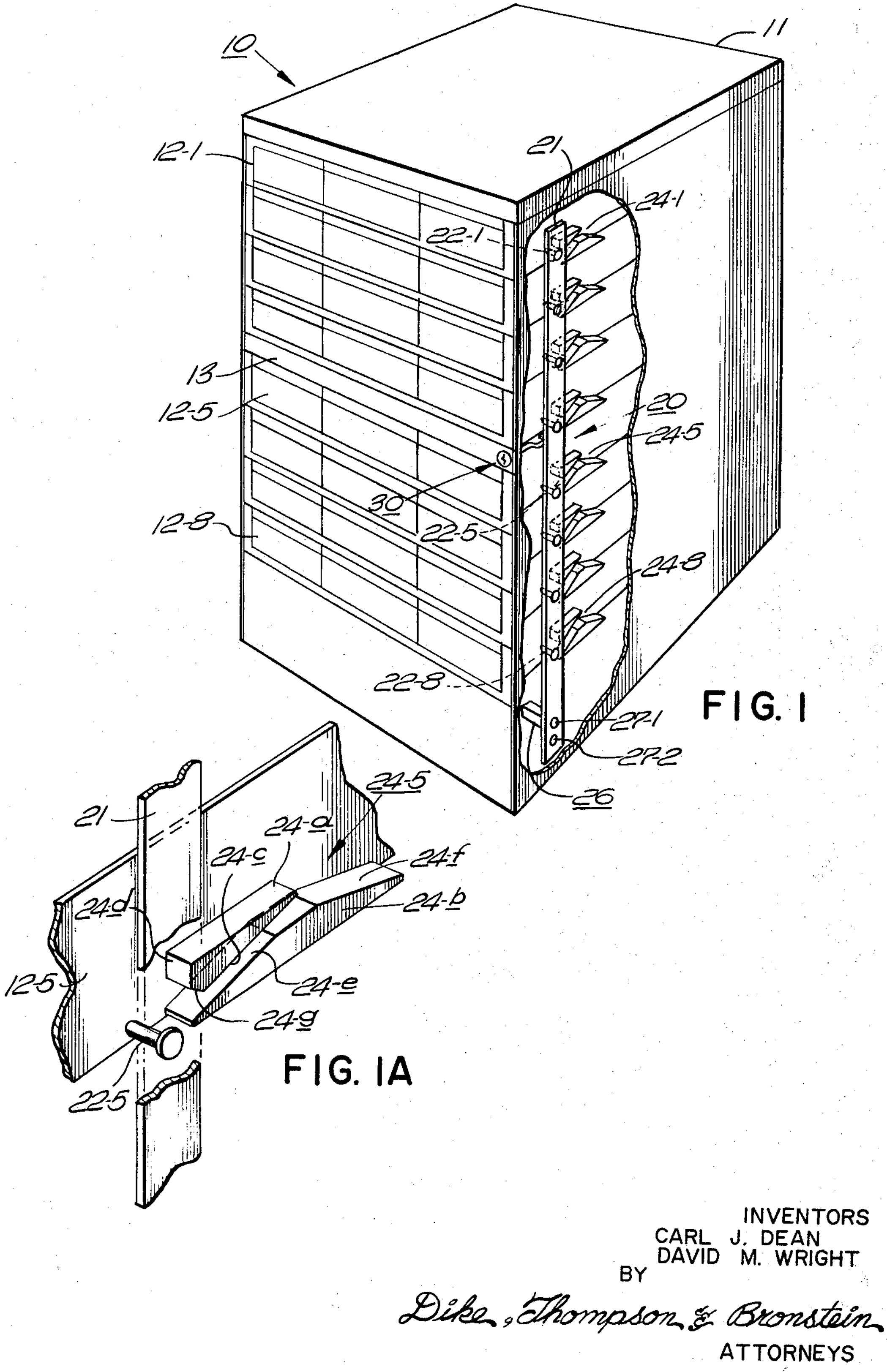
FIG. 1 is a perspective view of a closed, multi-drawer file system including an interlocking mechanism in accordance with the invention.
FIG. 1A is a partial perspective view of a portion of the interlocking mechanism for the file system of FIG. 1.

Turning to the drawings, FIG. 1 shows an illustrative file system 10 that incorporates an interlocking mechanism 20 in accordance with the invention. The system 10 includes a cabinet 11 in which eight drawers 12–1 through 12–8 are housed in two tiers of four drawers each. Each drawer has three removable trays which are particularly suitable for the storage of data processing cards. It will be appreciated that the disposition and arrangement of the drawers 12–1 through 12–8 within the cabinet 11 are merely illustrative. The interlocking mechanism 20 is suitable for employment with a wide variety of configurations in which the units to be interlocked may be arranged either vertically or horizontally.

Cooperating with the interlocking mechanism 20 is a keyed lock 30 by which all of the drawers 12–1 through 12–8 may be secured in a closed position. The lock 30 is mounted in a cross brace 13.

In general the interlocking mechanism 20 of FIG. 1 includes a movable member 21 which is proportioned to cooperate with prescribed ones of the drawers 12–1 through 12–8 so that the withdrawal of a particular drawer, for example the fifth drawer 12–5, will move the member 21 to a position where the remaining drawers of the cabinet are held in place until the opened drawer is returned to its closed position.

For the particular embodiment of FIG. 1 the movable member 21 is a vertical locking bar with projections 22–1 through 22–8 which are selectively engageable by cam assemblies 24–1 through 24–8, associated with respective drawers 12–1 through 12–8. The locking bar 21 is slidably mounted in conventional fashion for vertical reciprocating motion within the cabinet in the vicinity of a side panel. Near the base of the cabinet 11 is a retainer 26 for maintaining the bar 21 in either a locked or an unlocked position by engagement with respective apertures 27–2 and 27–1.

As specifically indicated in FIG. 1A for a representative cam assembly 24–5 of the fifth drawer 12–5, each such assembly has a first or upper member portion **24–*a* and a second or lower member portion 24–*b*. The upper portion 24–*a* has two intersecting ramp surfaces 24–*c* and 24–*g* and an end surface 24–*d*. The lower portion 24–*b* has oppositely sloping ramp surfaces 24–*e* and 24–*f***.

In construction, the cam members **24–*a* and 24–*b* are desirably of solid material exhibiting a low coefficient of friction with respect to the projection that they engage of the locking bar 21. Materials such as acetal resin or nylon have been found to be suitable for the cam members 24–*a* and 24–*b* when the projections 22–1 through 22–8 are of steel. Conversely, the cam members may be of steel, in which case the projections are of a material having a suitable coefficient of friction. The cam members are affixed in any conventional fashion, as by riveting, to a sidewall of the drawer with which they are associated, for example the drawer 12–5 in FIG. 1A. On the bar 21, the projection engaged by the cam members 24–*a* and 24–*b*, for example the projection 22–5 of FIG. 1A, is illustratively a steel pin which forms a press fit with an aperture in the bar 21. The other materials of the file system 10** are a matter of design.

When all of the drawers 12–1 through 12–8 of the cabinet 11 are in a closed position, as indicated by FIG. 1 the locking bar 21 is held in a downward position by the action of the spring-loaded retainer 26 in engaging the upper aperture 27–1 of the locking bar 21. In this position none of the projections 22–1 through 22–8 of the locking bar 21 block movement of any of the cam assemblies 24–1 through 24–8. This is illustrated in FIG. 1A where the pin 22–5 projects inwardly from the bar 21 to the vicinity of the sidewall of the fifth drawer 12–5. The pin 22–5 occupies an intermediate position at the mouth of the channel defined by the surfaces **24–*g* and 24–*c* of the upper member 24–*a* and the surface 24–*e* of the lower member 24–*b*, so that there is no impediment to the outward movement of the drawer 12–5. The same relative positioning applies to all of the drawers 12–1 through 12–8 of the cabinet 11** in FIG. 1.

Figures 2, 2A:
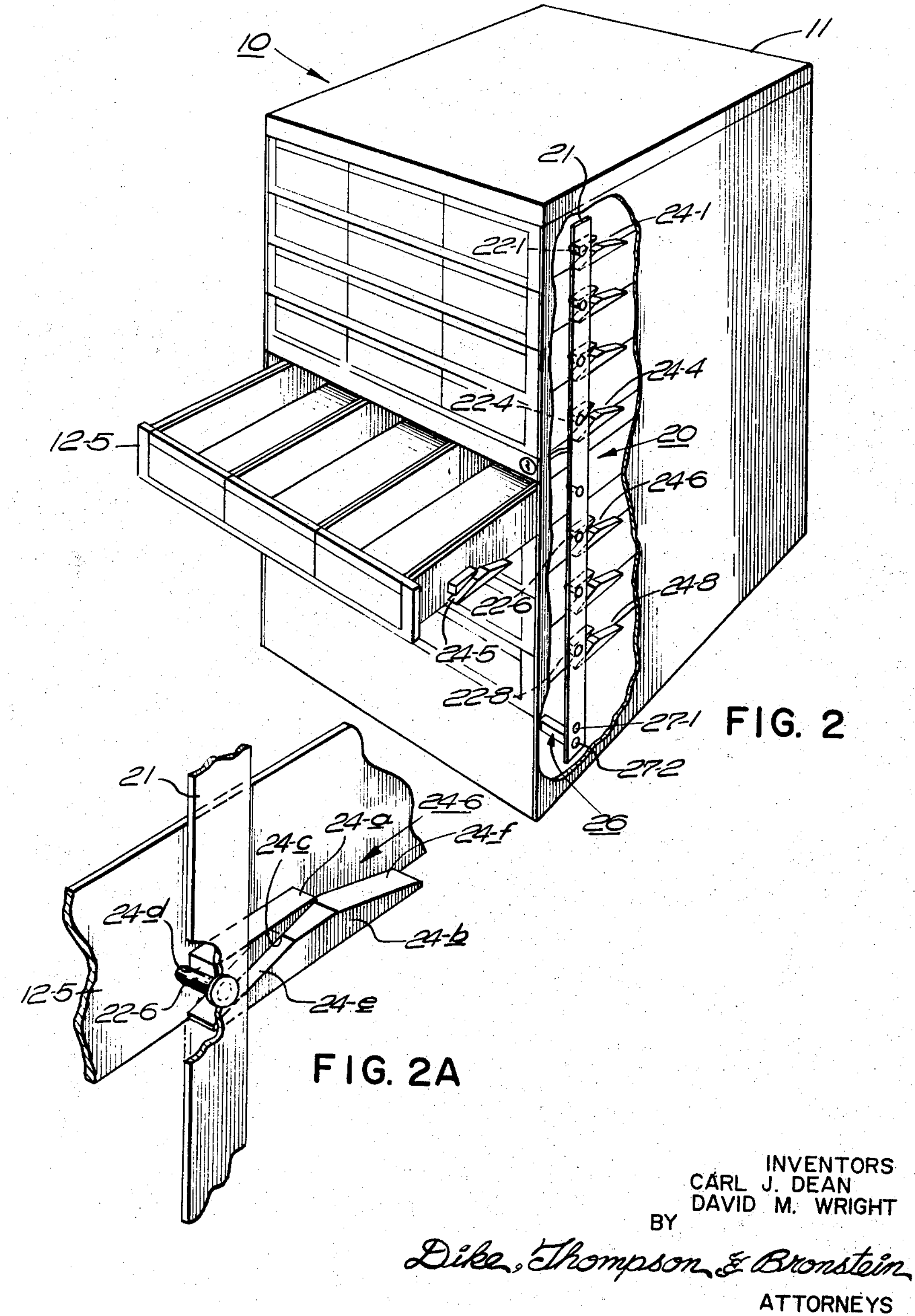
FIG. 2 is a perspective view of the file system of FIG. 1 with a selected drawer in an open position.
FIG. 2A is a partial perspective view of a portion of the interlocking mechanism for the file system of FIG. 2.

When a selected drawer is withdrawn, for example the first drawer of the lower tier, i.e. the fifth drawer 12–5, the ramp surface **24–*e* engages the pin projection 22–5 of the locking bar 21. This causes the locking bar 21 to rise and be held in place by the action of retainer 26 on the lower aperture 27–2, as shown by FIG. 2. With the bar in its upper position, each of the projections 22–1 through 22–4 and 22–6 through 22–8 is in the vicinity of the front surface 24–*d* of an upper cam member 24–*a*, as illustrated in FIG. 2A for a particular cam assembly 24–6. Consequently, the remaining drawers of the cabinet 11** are blocked, and none may be opened inadvertently to cause the cabinet to tip.

When the opened drawer, for example the drawer 12–5 shown in FIG. 2, is returned to its closed position, the cam surface **24–*c* of the upper member 24–*a* engages the pin projection 22–5 and forces the locking bar 21** to the initial position shown in FIG. 1.

Figures 3A, 3B, 3C, 4A, 4B, 4C, 5, 6A, 6B:
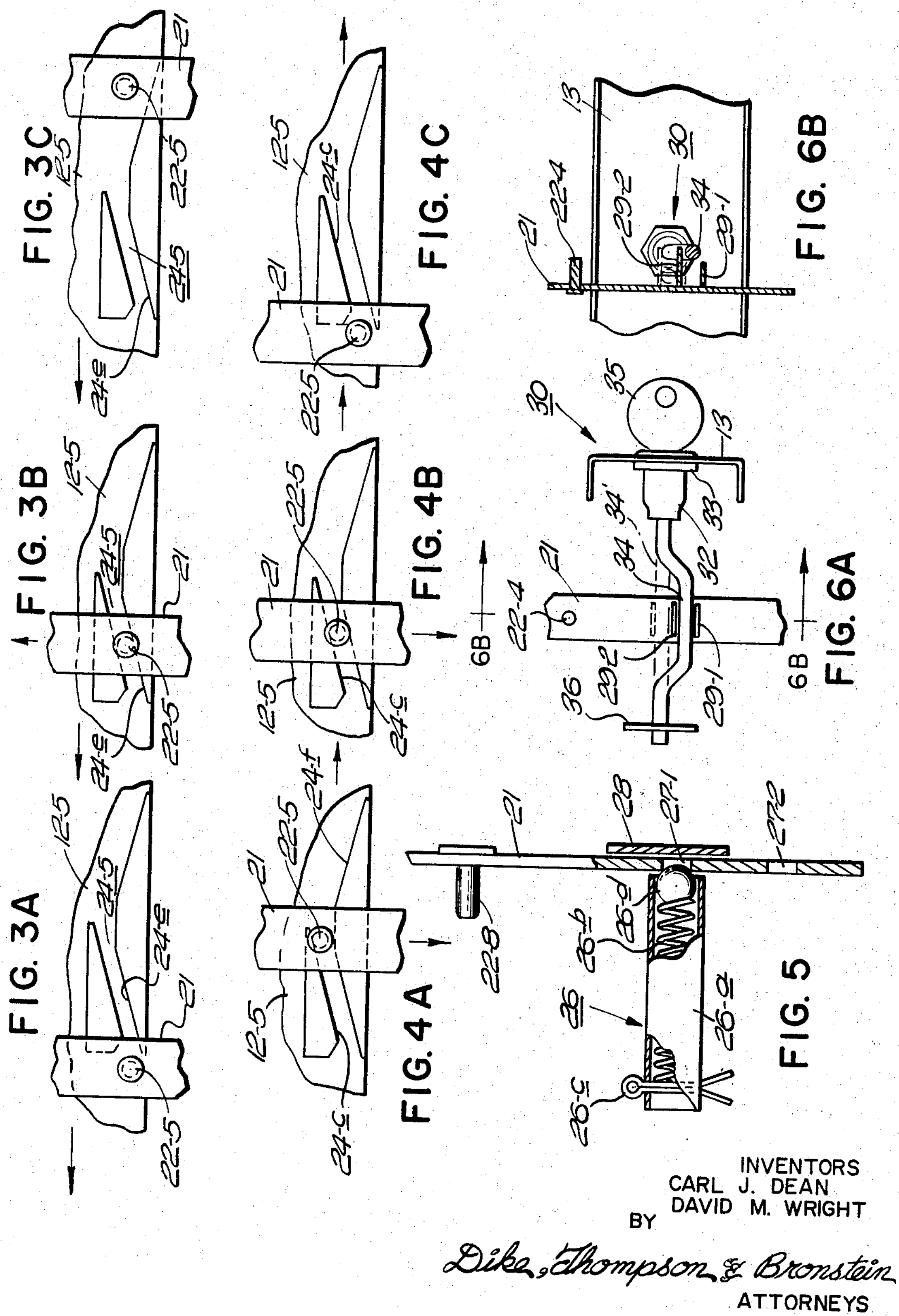
FIGS. 3A, 3B and 3C are diagrams illustrating the operation of the interlocking mechanism during the opening of a selected drawer of the file system of FIG. 1.
FIGS. 4A, 4B and 4C are diagrams illustrating the operation of the interlocking mechanism during the closure of the opened drawer of FIG. 2.
FIG. 5 is a partially cut away elevational view of a retainer for the interlocking mechanism of FIG. 1.
FIG. 6A is a partial elevational view of a single key lock in accordance with the invention.
FIG. 6B is a sectional view of the lock of FIG. 6A taken on the lines 6B—6B of FIG. 6A.

The interaction that takes place between a pin projection of the bar 21 and the cam assembly of a drawer that is being opened and closed is illustrated in FIGS. 3A through 3C for the opening of a drawer and in FIGS. 4A through 4C for the closing of a drawer.

For illustration the fifth drawer 12–5 of the cabinet 11 has been selected. Initially, as indicated by FIG. 3A, the locking bar 21 is stationary while the drawer 12–5 is being withdrawn. As the drawer continues to be withdrawn, as indicated by FIG. 3B, the ramp surface 24–e engages the pin projection 22–5, which rides upon the ramp causing the bar 21 to be raised. When the drawer is withdrawn, as shown in FIG. 3C, to a position where the pin projection 22–5 has cleared the forward ramp surface, the bar is stationary and in a locking position with respect to the closed drawers of the filing cabinet.

In the return cycle of operation for the locking bar 21, commencing in FIG. 4A, the cam surface 24–c comes into contact with the pin projection 22–5. This engagement brings about a downward movement of the locking bar 21, as shown in FIG. 4B. The bar 21 continues to move downward until, as indicated in FIG. 4C, the pin projection 22–5 clears the lowermost point of the cam surface 24–c. The locking bar 21 is then held in position by the retainer 26 as shown in FIG. 5.

The retainer 26 of FIG. 5 illustratively includes a housing 26–a with a spring 26–b that is held by a cotter pin 26–c. The spring 26–b acts upon a ball member 26–d. The latter is urged into respective apertures 27–1 and 27–2 as the locking bar 21 is moved by the opening and closing of the drawer of the cabinet, thus maintaining the bar 21 in either its upper or lower position. FIG. 5 also shows the lowermost pin projection 22–8 at the level of the lowermost drawer 12–8 of the cabinet 11, as well as a support plate 28 for the locking bar 21.

It is to be noted that if the locking bar 21 shown in FIGS. 2 and 2A inadvertently falls from its elevated position, with one of the drawers open, the cam surface 24–f on the lower member 24–b of the opened drawer is able to engage the pin projection of the fallen bar, raising it and permitting the pin to thereafter travel to its regular return position. In addition, the upper cam member 24–a, as seen in FIG. 1A, advantageously has a bevel ramp surface 24–g to provide latitude in locating the various pin projections on the bar 21.

Turning to FIGS. 6A and 6B, details are shown for the keyed lock 30 by which the drawers 12–1 through 12–8 of FIG. 1 are secured in a closed position. The lock 30 includes a housing 32 which is held against the cross brace 13 by a lock nut 33. A crank 34 extends from the housing 32 to a support 36, positioned within the cabinet 11 in conventional fashion. At the level of the lock 30, the locking bar 21 has two projecting brackets 29–1 and 29–2. As seen from FIG. 6B the upper bracket 29–2 projects further than the lower bracket 29–1. Thus, in regular operation, the locking bar 21 moves to upward and downward positions without interference by the crank 34 of the lock 30. However, when the drawers 12–1 through 12–8 are to be secured in a closed position, the use of a key 35 causes the crank 34 to rotate against the upper bracket 29–2 to the phantom position 34'. This moves the locking bar 21 to a position where the various pin projections block the drawers until the crank is returned to its original orientation.

While embodiments of various aspects of the invention have been shown in the drawings, it is to be understood that this disclosure is for the purpose of illustration only and that various changes in shape, proportion and arrangement of parts, as well as the substitution of equivalent elements for those herein shown and described, may be made without departing from the spirit and scope of the invention as set forth in the appended claims.

We claim:

1. In a filing cabinet containing a set of drawers, apparatus for maintaining prescribed drawers of said cabinet in closed position when a selected one of said drawers is opened, comprising:

a slidable locking bar spanning said drawers and including, for each drawer, a pin projecting to the vicinity of said drawer, and means mounted on said drawers and cooperating with said slidable member, having for each drawer, (1) a first portion for engaging said pin to move said slidable member in a first direction to a first position to prevent the opening of prescribed drawers when a selected drawer is moved to an open position and (2) a second portion for engaging said pin, in said first position, to move said slidable member in a second direction to a second position to permit the opening of said prescribed drawers when said selected drawer is closed.

2. In a filing cabinet containing a set of drawers, apparatus for maintaining prescribed drawers of said cabinet in closed position when a selected one of said drawers is opened, comprising:

a slidable locking bar spanning said drawers and including, for each drawer, a pin projecting to the vicinity of said drawer, and a plurality of cam assemblies associated with said drawers and cooperating with said slidable member, each of said cam assemblies including, for each drawer, (1) a first cam member mounted on said drawer and having a cam surface for engaging said pin to move said bar when said drawer is opened and (2) a second cam member mounted on said drawer in the vicinity of said first cam member and having a cam surface for engaging said pin to move said bar when said drawer is closed.

3. Apparatus as defined in claim 2 wherein the cam surfaces of the first and second cam members face each other and have ramp surfaces with respective upward and downward slopes with respect to the principal axis of said locking bar.

4. Apparatus as defined in claim 2 wherein said means cooperating with said slidable member further includes means for repositioning said slidable member upon inadvertent movement thereof.

5. Apparatus as defined in claim 2 further including means for maintaining said slidable member in a discrete one of two positions.

6. Apparatus as defined in claim 2 further including means for lockably securing all of said drawers in their closed positions.

7. Apparatus as defined in claim 2 further including means for lockably securing all of said drawers in their closed positions, comprising:

means for engaging said locking bar and moving said bar to a position where said pins block the travel of said cam assemblies.

8. Apparatus as defined in claim 7 wherein:

the second cam member of each cam assembly includes an end face;

said locking bar includes a pair of brackets projecting therefrom, one of said brackets being longer than the other; and said means for lockably securing said drawers comprises:

(1) a housing mounted in said cabinet and containing a key actuated and rotatable locking member and (2) a crank extending from said housing and being disposed to be rotatable, upon the turning of said key, to engage the longer one of said brackets and move said locking bar to a locking position in which said pins confront the end faces of said cam assemblies and prevent movement thereof, said crank, in said locking position, being counter rotatable, by action of said key, to engage the shorter one of said brackets and return said locking bar to its original, unlock position.

9. Apparatus as defined in claim 3 wherein said means cooperating with said slidable member further includes, on the first cam member of each cam assembly, an auxiliary ramp surface sloping away from the first mentioned cam surface thereof for engaging and moving said locking bar following inadvertent movement thereof.

10. Apparatus for locking the remaining drawers of a multi-drawer cabinet when one of the drawers is opened, comprising:

a slide bar mounted for reciprocating movement across the span of said drawers and including a plurality of projections extending outwardly therefrom, there being one such projection for each drawer, and a cam assembly mounted on each drawer including:

(1) a first cam follower for engagement with one of said projections upon outward movement of the associated drawer, to move said bar in a first direction to prevent outward movement of the remaining drawers and (2) a second cam follower for engagement with the previously engaged projection upon inward movement of said associated drawer, to move said bar in a second direction, opposite to the first, to unlock said other drawers.

References Cited

UNITED STATES PATENTS

| | | | |
|---|---|---|---|
| 1,716,274 | 6/1929 | Jones | 312—217 |
| 2,719,770 | 10/1955 | Roberts | 312—221 |
| 2,842,419 | 7/1958 | Howard | 312—222 X |
| 2,966,384 | 12/1960 | Bergman | 312—218 |

CASMIR A. NUNBERG, *Primary Examiner.*